United States Patent
Gustafsson et al.

(10) Patent No.: US 6,643,275 B1
(45) Date of Patent: *Nov. 4, 2003

(54) RANDOM ACCESS IN A MOBILE TELECOMMUNICATIONS SYSTEM

(75) Inventors: Maria Gustafsson, Stockholm (SE); Henrik Olofsson, Stockholm (SE); Fredrik Ovesjö, Solna (SE); Georg Frank, Nümberg (DE); Wolfgang Granzow, Heroldsberg (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 09/079,438

(22) Filed: May 15, 1998

(51) Int. Cl.[7] .................................................. H04Q 7/00
(52) U.S. Cl. ................................................... 370/328
(58) Field of Search .............................. 370/445, 319, 370/320, 479, 395, 206, 342, 455, 335, 328–331; 375/142, 130, 200, 206, 349

(56) References Cited

U.S. PATENT DOCUMENTS

| | | | |
|---|---|---|---|
| 4,856,028 A | 8/1989 | Scales ........................ 375/97 |
| 5,132,985 A | 7/1992 | Hashimoto et al. ............ 375/1 |
| 5,272,446 A | 12/1993 | Chalmers et al. ........... 329/304 |
| 5,506,861 A | 4/1996 | Bottomley .................. 375/200 |
| 5,515,379 A | 5/1996 | Crisler et al. ............. 370/95.3 |
| 5,583,517 A | * 12/1996 | Yokev et al. ................ 342/457 |
| 5,603,081 A | 2/1997 | Raith et al. ................ 455/33.1 |
| 5,619,524 A | 4/1997 | Ling et al. .................. 375/200 |
| 5,621,752 A | 4/1997 | Antonio et al. ............. 375/200 |
| 5,673,259 A | 9/1997 | Quick, Jr. ................... 370/342 |
| 5,754,583 A | 5/1998 | Eberhardt et al. .......... 375/200 |
| 5,778,316 A | 7/1998 | Persson et al. ............. 455/434 |
| 5,822,359 A | 10/1998 | Bruckert et al. ............ 375/200 |
| 5,930,288 A | 7/1999 | Eberhardt ................... 375/200 |
| 6,091,718 A | * 7/2000 | Saunders et al. ........... 370/331 |
| 6,381,229 B1 | * 4/2002 | Narvinger et al. .......... 370/328 |

FOREIGN PATENT DOCUMENTS

DE  P 25 37683.4  8/1975
EP  0 257 110 A1  8/1986

(List continued on next page.)

OTHER PUBLICATIONS

U.S. patent application Ser. No. 08/733,501, Related U.S. Application, filed Oct. 18, 1996.
U.S. patent application Ser. No. 08/847,655, Related U.S. Application, filed Apr. 30, 1997.
U.S. patent application Ser. No. 09/169,731, Related U.S. Application, filed, Oct. 09, 1998.
U.S. patent application Ser. No. 60/063,024, Related U.S. Application, filed Oct. 23, 1997.
International Search Report for PCT/SE98/01921 completed Jun. 21, 1999.
EPO Search Report; File No. RS 99454US; Search Completed Oct. 20, 1997.
"Design Study for a CDMA–Based Third–Generation Mobile Radio System"; Baier, et al.; *IEEE Journal On Selected Areas In Communications*; May 1994; pp. 733–743.

Primary Examiner—Kwang Bin Yao
Assistant Examiner—Prenell Jones (57) ABSTRACT

An uplink common physical channel (random access channel) frame structure with a separate preamble and data portion. The preamble is used by a base station to detect that a mobile station is attempting a random access request. The data portion of the channel includes user data, and pilot symbols that provide energy for channel estimation during reception of the data portion. A guard interval is preferably inserted between the preamble and data portion of the frame, which enables data detection to occur during an idle period. As such, the frame structures for both the common physical (random access) uplink channel and dedicated physical (traffic) uplink channel are compatible.

51 Claims, 4 Drawing Sheets

FOREIGN PATENT DOCUMENTS

| | | |
|---|---|---|
| EP | 0 633 671 A2 | 5/1994 |
| EP | 0 765 096 A2 | 3/1997 |
| WO | WO 9221196 | 11/1992 |
| WO | WO 94/26074 | 11/1994 |
| WO | WO 95/14336 | 5/1995 |
| WO | WO 95/22210 | 8/1995 |
| WO | WO 96/13952 | 5/1996 |
| WO | WO 97/05708 | 2/1997 |
| WO | WO 97/11571 | 3/1997 |
| WO | WO 98/18280 | 4/1998 |
| WO | WO 98/23047 | 5/1998 |
| WO | WO 98/49857 | 11/1998 |

\* cited by examiner

RANDOM ACCESS IN A MOBILE TELECOMMUNICATIONS SYSTEM

BACKGROUND OF THE INVENTION

1. Technical Field of the Invention

The present invention relates in general to the mobile telecommunications field and, in particular, to a method and system for processing multiple random access calls in a Code Division Multiple Access (CDMA) or Wideband CDMA (WCDMA) system.

2. Description of Related Art

For the next generation mobile communication systems, such as the IMT-2000 and Universal Mobile Telecommunications System (UMTS), Direct Sequence-CDMA (DS-CDMA) approaches have been proposed for use in the United States, Europe and Japan. In this regard, a similar WCDMA system is being considered for use in both Europe and Japan, but a somewhat different DS-CDMA concept is being considered for use in the United States.

These next generation systems will be required to provide a broad selection of telecommunications services including digital voice, video and data in packet and channel circuit-switched modes. As a result, the number of calls being made is expected to increase significantly, which will result in much higher traffic density on random access channels (RACHs). Unfortunately, this higher traffic density will also result in increased collisions and access failures. Consequently, the new generation of mobile communication systems will have to use much faster and flexible random access procedures, in order to increase their access success rates and reduce their access request processing times. In other words, there will be a high demand for much faster and more efficient access in those systems due to the expected substantial increase in packet-switched traffic.

The proposed WCDMA approach includes two different ways to transmit packets, on a common channel and a dedicated channel. However, there will be a high demand for faster and more efficient random access using either transmission scheme. For example, commonly-assigned U.S. patent applications Ser. Nos. 08/733,501 and 08/847,655, and U.S. Provisional Application Serial No. 60/063,024 describe such a random access approach, which can be used for a packet-based service where a mobile station (MS) can transmit packets on a common channel and a dedicated channel. For the common channel case, the packets are included in the random access requests being transmitted. For the dedicated channel case, the random access requests being transmitted include requests for a dedicated channel on which to transmit the associated packets.

The above-described patent applications disclose a Slotted-ALOHA (S-ALOHA) random access approach. Using this approach, a common transmission medium can be shared by a plurality of users. Essentially, the transmission medium is divided into a plurality of access slots, which are characterized by a time offset relative to the received frame boundary. Each user (MS) randomly selects an access slot and then transmits its message information in that access slot. However, a shortcoming of this approach is that the access slots are not allocated to the users, which can result in collisions between the different users' transmissions.

Figure 1:
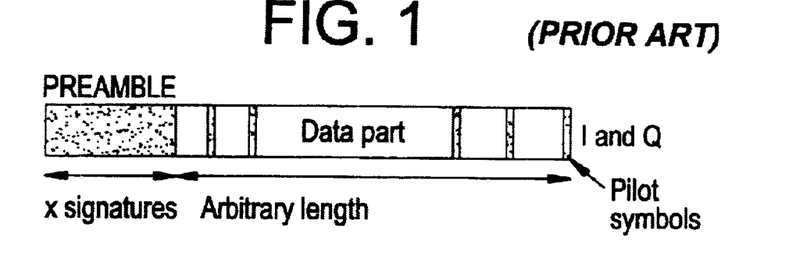
FIG. 1 is a diagram that illustrates an existing channel frame structure for a random access request.

For example, using the S-ALOHA random access approach in the above-described patent applications, a MS generates and transmits a random access request. A diagram that illustrates a frame structure for such a random access request is shown in FIG. 1. The frame structure shown is used in the first two of the above-described patent applications. As shown, the random access request comprises a preamble and a data field portion. The preamble part is used primarily as a ringing function. The data portion includes the request and/or the data packet. In order to reduce the risk of collisions for requests from different MSs that choose the same access slot, the preamble for each MS's request contains a unique signature (bit) pattern. The MSs randomly select the signature patterns used (preferably from a limited set of signature patterns), which further reduces the risk of collisions.

The following procedure is typically used in an S-ALOHA random access system. First, an MS is synchronized to a base station. The MS "listens" to a broadcast channel over which, for example, the network broadcasts random access codes, broadcast channel transmit power level, and the interference signal level measured at that base station. Next, the MS estimates the downlink path loss, and together with the knowledge of the base station interference signal level and the transmit power level, estimates a transmit power level to use. The MS then selects an access slot and signature pattern, and transmits its random access request on the selected access slot and with the selected signature pattern. The MS awaits an acknowledgment to the access request from the base station. If the MS does not receive an acknowledgment from the base station within a predetermined (time-out) period, the MS selects a new access slot and signature pattern, and transmits a new random access request.

Referring to FIG. 1, the preamble portion is modulated with different signature patterns, and spread with a base station-unique spreading code. The signature patterns are used for separating different simultaneous random access requests, and also to determine which spreading/scrambling code to use on the data portion of the requests. Consequently, as mentioned earlier, the requests from two different MSs that use the same access slot but with different signature patterns can be separated. Also, pilot symbols can be inserted into the data portion of the request, in order to facilitate coherent detection. The preamble portion of the request can also be used for coherent detection, but if the data portion is relatively long, the channel estimate has to be updated accordingly.

Figure 2:
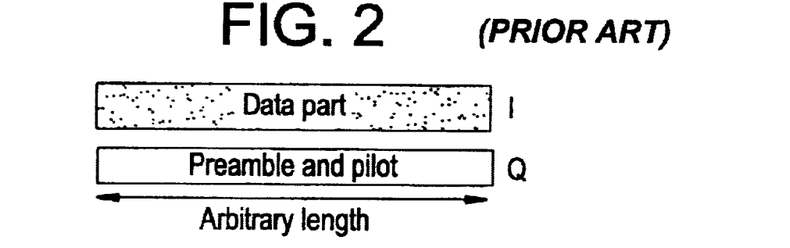
FIG. 2 is a diagram that illustrates a second existing channel frame structure for a random access request.

FIG. 2 illustrates the frame structure of the random access request described in the third of the above-described patent applications. Using the frame structure shown, the data portion is transmitted on the I branch of the channel, and the preamble/pilot is transmitted on the Q branch. This frame structure is used in order to make the random access channel compatible with the other dedicated uplink channels used, which for the WCDMA approach is I/Q multiplexed. In any event, it does not matter whether the data and pilot symbols are time-multiplexed, I/Q multiplexed, or code-multiplexed (which can be performed among other methods by complex scrambling an I/Q multiplexed signal).

A frame is divided into a number of time slots on the dedicated data channel according to the power control command rate. These slots are denoted frame slots. In the proposed WCDMA systems, there are 16 of these frame slots per frame. In a random access scheme, a frame is also sub-divided into a number of access slots, but the purpose is to increase the throughput efficiency of the random access process. An access slot defines a period in which an MS can start its transmission of a random access request. Using the random access approach in the first two of the above-described patent applications, the random access requests can, for example, be transmitted in consecutive access slots as shown in FIG. 3.

Figure 3:
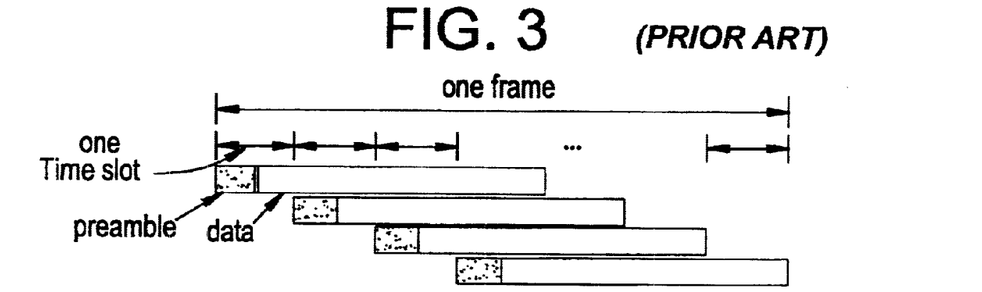
FIG. 3 is a diagram that illustrates an existing channel frame structure for random access requests made in consecutive access (time) slots.

The data portion of the random access requests shown in FIG. 3 is scrambled by a long code (same length as the data portion). Consequently, an access slot plus a guard time can be equal to N frame slots. Preferably, the preambles from different access slots should not overlap, because there would be too many preamble detectors required in the base station, and the interference (due to the same spreading codes being used) would be increased for the random access detection process. However, for the frame structure used in the third of the above-described patent applications, the throughput efficiency of the random access channel may be reduced, because longer preambles are being used and the preambles of different access requests in different access slots should not overlap.

The random access receiver in the base station is comprised of two sections, wherein one section detects the preamble, and the second section detects the data portion of the request. The section that detects the preamble includes a matched filter, which is matched to the spreading code used on the signatures. The modulation of the output signal of the matched filter is removed by multiplication with the expected signature symbols (remodulation), in order to separate random access requests from different MSs that have used different signatures.

When a random access request is registered in the preamble detector section of the base station receiver, a plurality of RAKE fingers are allocated in order to detect the data portion of that request. Also, the preamble detector section couples the frame timing of the data portion of the request to the RAKE receiver, along with the spreading code used on the data portion, and an initial estimate of the channel response. The RAKE receiver detects the data from the data portion, and the base station processes the data and responds to that MS's random access request.

A problem with the above-mentioned application's approach is that the random access channel used is not compatible with the other uplink channels used in the proposed WCDMA approach. Consequently, new hardware needs to be developed for the data portion of the random access channel.

A problem with the third above-described application's approach is that although it avoids the uplink channel compatibility problem, it requires a significant amount of additional buffering. Another problem with this approach is that the random access request message processing rate will be reduced, because the preambles from different access slots should not overlap, and the preambles in this approach are relatively long.

A problem with the third random access approach (described in the third application), which does not exist for the other approaches, is that if the data portion of the request is longer than one access slot, then an ambiguity in detection of the frame timing may exist. In that case, the pilot symbol in each access slot may carry a signature which is the same in each access slot, or the signature may be changed from access slot to access slot. As such, there can be numerous times during a data transmission when a signature is detected. However, the base station receives one timing signal per access slot, and therefore, there can be a problem in determining the exact frame timing. Although this problem can be solved with existing means, such a solution is rather complicated.

An additional problem with this approach is that during the random access detection process, the complete access slot has to be buffered for subsequent data detection until the random access request has been detected by decoding the simultaneously transmitted signature pattern. This step takes one access slot to complete and thus requires maximum buffering of one complete access slot.

Additional buffering is also required during the data portion detection used in the other two approaches (as well as in the method of the present invention), because channel estimation has to be performed based on a continuously transmitted pilot channel (approach three above), or periodically inserted pilot symbols (approach one above). In other words, the channel estimates have to be provided in parallel with each received data symbol. The buffering needed is only for as long as it takes to calculate a channel estimate related (i.e., transmitted during the same time) to a data symbol.

SUMMARY OF THE INVENTION

In accordance with a preferred embodiment of the present invention, an uplink common physical channel (random access channel) frame structure is provided with a separate preamble and data portion. The preamble is used by the base station to detect that a MS is attempting the random access request. The data portion of the channel includes user data, and pilot symbols that provide energy for channel estimation during reception of the data portion. A guard interval is preferably inserted in the preamble portion of the frame, which enables some data detection to occur before the actual data detection process is started. Consequently, the buffering of data can be minimized.

An important technical advantage of the present invention is that the frame structure on the common physical uplink channel is compatible with the frame structure on the dedicated physical uplink channel.

Another important technical advantage of the present invention is that each portion of the random access request has to fulfill only one function and can thus be optimally designed for that respective task.

Still another important technical advantage of the present invention is that the same type of code allocation scheme can be used for both the data portion of the random access request and the dedicated uplink channels.

Yet another important technical advantage of the present invention is that all necessary post-processing, such as for example, signature decoding, can be accomplished during a guard period. Consequently, the hardware design for random access request detection can be simplified, and the random access request processing delay can be minimized.

Still another important technical advantage of the present invention is that the same receiver hardware can be used for decoding both the data portion of the common physical uplink channel and the conventional dedicated physical uplink channel, which unifies the hardware design and lowers the hardware costs.

Yet another important technical advantage of the present invention is that a pool of RAKE receivers or RAKE fingers can be assigned or shared for both the common physical channel (random access data packet) and dedicated physical channel (traffic channel), which minimizes the amount of hardware required.

Still another important technical advantage of the present invention is that the buffer size requirements can be minimized, because the functions of the preamble and data portion of the random access request are separated.

Still another important technical advantage of the present invention is that the random access request rate can be increased in comparison with other random access approaches. In particular, the random access request rate for the third of the above-described random access approaches would be lower than that for the present invention for the same amount of hardware used.

Yet another important technical advantage of the present invention is that a capability for transmitting the random access messages at different rates can be achieved in a very flexible way.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–9 of the drawings, like numerals being used for like and corresponding parts of the various drawings.

Essentially, in accordance with a preferred embodiment of the present invention, an uplink common physical channel (random access channel) frame structure is provided with a separate preamble and data portion. The preamble is used by the base station to detect that a MS is attempting the random access request. The data portion of the channel includes user data, rate information, and pilot symbols that provide energy for channel estimation during detection of the data portion. A guard interval is preferably inserted between the preamble and data portion of the frame, which enables detection of the preamble before the data arrives (requiring less buffering). As such, the frame structures for both the common physical (random access) uplink channel and dedicated physical (traffic) uplink channel are compatible.

Figure 4:
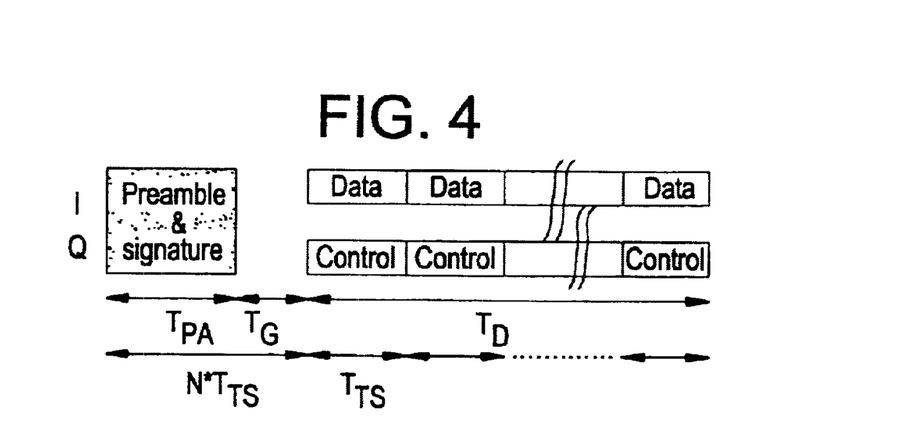
FIG. 4 is a diagram that illustrates a frame structure for a random access channel in a WCDMA mobile communications system, in accordance with a preferred embodiment of the present invention.

Specifically, FIG. 4 is a diagram that illustrates a I/Q Multiplexed frame structure for a random access channel in a WCDMA mobile communications system, in accordance with a preferred embodiment of the present invention. The bottom set of arrowed lines represents the timing of an existing frame structure, which is provided herein for comparison purposes. The preamble portion of the frame structure shown in FIG. 4 can be optimally designed for random access detection and signature detection. As such, a base station can be continuously "listening" for such a transmitted preamble. In order to distinguish between simultaneous random access requests being transmitted by different MSs, each preamble of a random access request is modulated by a unique signature pattern, which is randomly selected by the respective MS transmitting the request. An example of such a signature-modulated preamble in a random access request is described in the first two of the above-described patent applications, which are incorporated completely herein in their entirety.

As such, the signature pattern for each preamble is randomly selected by the MS from a plurality of orthogonal codes. For this embodiment, each of these orthogonal codes has a length of $2^{Nsig}$ symbols, and is spread with a known base station-unique spreading code (i.e., spreading code number provided earlier via the base station's broadcast channel). The parameter, $N_{sig}$, is the order number of the detected signature pattern. Each such symbol is spread by the same code sequence of length SF, where "SF" denotes the spreading factor of the code. Typically, the resulting length of the preamble (e.g., $SF*2^{Nsig}/R_{chip}$, where $R_{chip}$ is the chip rate or rate of the spreading sequence) is less than the length, $N*T_{TS}$, of N frame slots in existing systems. Consequently, in accordance with the present invention, a guard time interval, $T_G$, can be generated by interrupting the MS's transmission power from the end of the preamble to the beginning of the next frame slot. The time (or length) of the novel frame is thus represented in FIG. 4 as $T_{PA}$ (time or length of the preamble) plus $T_G$ (length of the guard time interval) plus $T_D$ (time or length of the data portion of the frame). This novel random access frame structure and method of use can reduce the MS's transmitted power (e.g., albeit slightly, by interrupting transmission during the interval between the preamble and data portion of the random access request), and the timing of the random access request can be aligned exactly to that of an existing system's frame slot scheme.

Additionally, in accordance with the preferred embodiment, during the guard time interval, $T_G$, the signature detection processing can be performed at the base station receiver (e.g., by using a fast Walsh-Hadamard transformation), and the base station can determine more quickly whether a random access request has been made. Subsequently, as described in detail below, an available RAKE receiver or RAKE finger (e.g., depending upon how many delay paths should be used) can be assigned, and during the guard time interval, $T_G$, the initial values from the signature detection process can be conveyed to the selected RAKE unit, which is prior in timing to that of existing systems.

An example of the use of such a guard time interval for random access request detection is where a preamble is 16 symbols long and spread with a 256 chips long orthogonal Gold code. In a system operating at 4.096 Mchips/sec, the preamble will be 1 ms long. In the proposed WCDMA systems, there are to be 16 frame slots per 10 ms.

Theoretically, a guard time interval, $T_G$, in this example could be 0.25 ms long.

Also in accordance with the preferred embodiment of the present invention, the data transmission portion of the novel uplink common physical channel shown in FIG. 4 can be designed independently from the requirements of the random access preamble. For example, in order to achieve a unified hardware design, it is preferable to use the same data and control (e.g., pilot and rate information) structures both on the common physical channel and the dedicated physical channel (i.e., the channel typically used for data traffic). As such, in accordance with the novel frame structure of the present invention, the pilot symbols can be spread in accordance with the dedicated physical channel uplink spreading scheme, and thus do not require any signature modulation. Consequently (e.g., in comparison with the third patent application mentioned earlier), the present invention affords significantly more freedom in selecting the length of the pilot field and additional common data (e.g., rate indicator or RI field). Additionally, with respect to FIG. 4, the pilot symbols being transmitted can be I/Q-code multiplexed, or alternatively time-multiplexed or code-multiplexed with the data.

Figure 5:
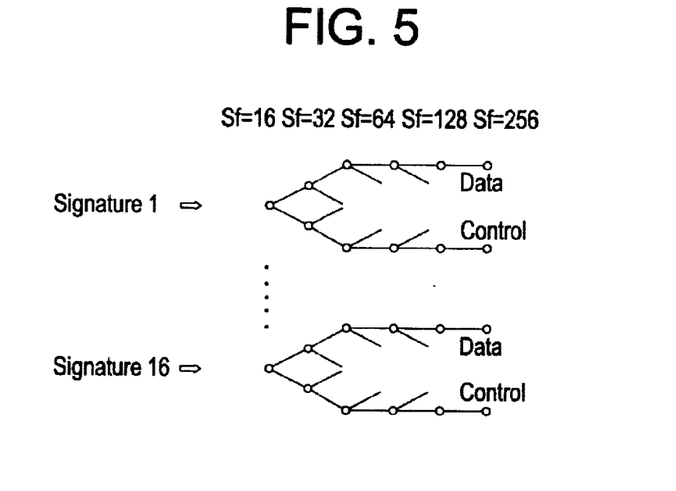
FIG. 5 is a code-tree diagram that illustrates an example of the channelization code allocation for the data portion of a random access request to be transmitted by a MS, in accordance with the preferred embodiment of the present invention.

FIG. 5 is a code-tree diagram that illustrates an example of the channelization code allocation for the data portion of a random access request to be transmitted by a MS, in accordance with the preferred embodiment of the present invention. In order to illustrate how the spreading and scrambling can be accomplished for the data portion of the random access request, the example shown illustrates how 16 different signature patterns can be used on the data portion. For the example shown, the signature pattern used for the preamble of the random access request points to one of 16 nodes in the code-tree that includes channelization codes of length 16. The sub-tree shown below the selected node can be used for spreading of the data portion of the request.

For example, referring to FIG. 5, if the MS spreads the control part (e.g., pilot on the Q-branch) with a channelization code having a spreading factor of 256 in the bottom part of the sub-tree (e.g., for signature 16), then for the data part (e.g., for the I-branch), the MS can use any of the channelization codes with a spreading factor from 32 to 256 in the upper part of that sub-tree. Of course, other alternatives exist. Additionally, for improved cross-correlation purposes, the data portion of the transmitted request can also be scrambled with a scrambling code that has the same length as the data portion (and, for example, can be a complex code).

In accordance with the present invention, the size of the data portion of the random access request can be variable. The problem associated with the proposed WCDMA system requirement for different random access request rates on the random access channel is resolved by the present frame structure which allows the use of different spreading factors on the data portion of the request (resulting in different amounts of data per request), and data fields that have different lengths in time (also resulting in different amounts of data per request).

For example, the use of different rates for the random access requests on a random access channel can be illustrated as follows. The different sets of signatures used can point to different spreading factors and/or lengths for the data portions. By having a base station broadcast a predetermined number of signatures to be assigned to a certain data rate, the base station can adapt the combination of signatures and data rate to the actual conditions of the traffic request being made.

As another example, the MS can include an RI field in the beginning of the control portion of the random access request. The control portion of the request has a known (to the base station) spreading factor (and hence also the code) and, therefore, can be readily detected at the base station. As such, data portions of different random access requests having both different lengths and spreading factors can still be readily detected by the base station.

As yet another example of the advantageous use of variable size data portions of random access requests in a WCDMA system, an RI can be spread over the complete control portion of a request (e.g., using a spreading approach similar to that used in existing dedicated uplink channels) However, this approach can require the use of additional buffering for the data portion of the requests. Alternatively, an RI can be included in the beginning of the data field of the request, which can be used for different lengths (in time) of the data portions.

Another example is a form of blind rate detection. In detecting variable length data portions, a cyclical redundancy check (CRC) can be performed at predetermined lengths. The coding is continued thereafter for just the next possible length in time. At the base station, the detection of the different spreading factors is accomplished by starting the detection of the smallest spreading factor observed, and if the CRC result is invalid, starting detection of the next-larger spreading factor, and so on.

As such, for each of the above-described variations, it is preferable to have a relatively small set of different rates to choose from, in order to minimize the signalling overhead and/or receiver complexity. Also, it is preferable to have the length of the data field divisible into the length of the frame slot of the other uplink channels in the system.

Figure 6:
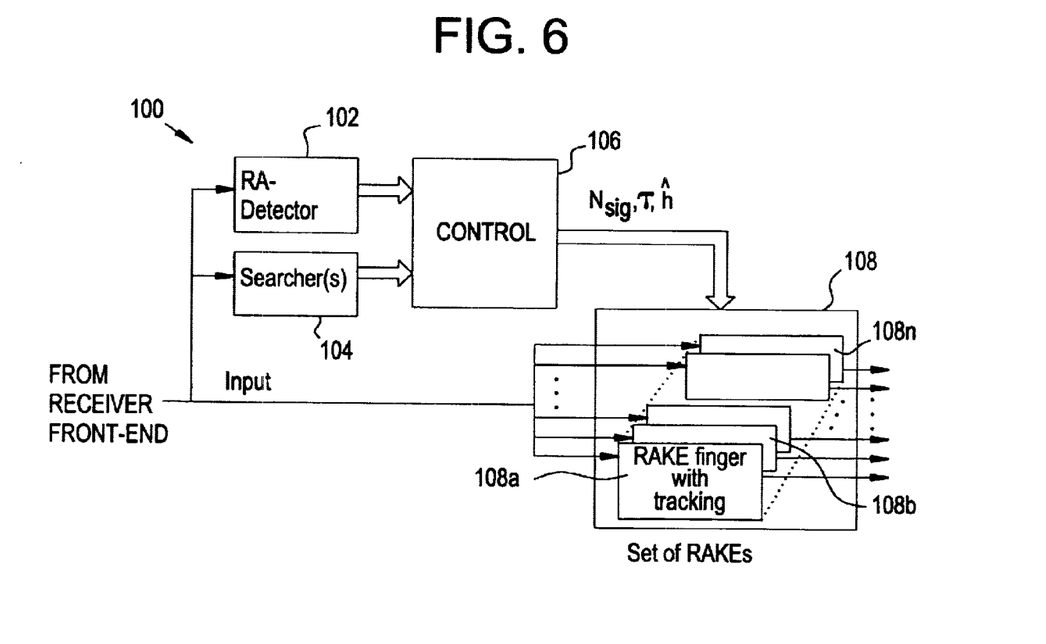
FIG. 6 is a simplified block diagram of an exemplary system for use in assigning a RAKE receiver component for despreading a data portion of a detected random access request in a WCDMA base station receiver, in accordance with the preferred embodiment of the present invention.

FIG. 6 is a simplified block diagram of an exemplary system (100) for use in assigning a RAKE receiver component for despreading a data portion of a detected random access request in a WCDMA base station receiver, in accordance with the preferred embodiment of the present invention. Essentially, the random access detection functions shown can detect signature patterns, estimate path delays, and also provide channel estimations, if so desired. The exemplary system 100 shown includes a random access detection unit 102, and at least one searcher unit 104. The receiver structure shown in FIG. 6, without the random access detection unit 102, can be a receiver for a regular traffic channel. A function of the random access detection unit 102 is to detect/find as many access requests as possible. This detection process (and a searching process) provides, for example, the path delay information. Detection of the data portion of the random access request is performed in the RAKE receiver unit 108 using the path delay information from the random access detection unit 102. One or more searcher units 104 are coupled in parallel with the random access detection unit 102. As such, the random access detection unit 102 can be viewed to function as a specialized type of searcher. The primary function of the one or more searcher units 104 is to detect all propagation delays on the traffic channels being used. However, both the random access detection unit 102 and the one or more searcher units 104 provide path delay information, which is used in the RAKE receiver unit 108.

The outputs of the random access detection unit 102 and one or more searcher units 104 are coupled to a control unit 106. The control unit 106 utilizes the path delay information, channel estimates, and signature information, in order to assign the detected data portion information to an appropriate RAKE receiver unit component 108a–108n for despreading. The output of the control unit 106 couples a control signal to the RAKE receiver unit 108, which includes the order number of the detected signature pattern, $N_{sig}$, which is used to assign a data rate for the subsequent data portion to be input to the RAKE receiver unit. The control signal from control unit 106 also includes the path delay estimate, $\tau_y$, which is used to set a correct delay in the RAKE receiver unit 108 for despreading the data portion at the input of the RAKE receiver unit. A channel estimate parameter, $\hat{h}$, is coupled from the control unit 106 and used as an initial channel estimate in the RAKE receiver unit 108.

In accordance with the present invention, the use of a guard time interval, $T_G$, between the random access request preamble and data portion enables the system 100 to accomplish all of the above-described post-processing during this idle period. Consequently, the hardware requirements imposed for buffering the incoming received data can be minimized. Furthermore, the use of a virtually identical structure for the data portion of the received request for both the common and dedicated physical channels simplifies the design of the base station receiver. The advantages of this novel random access scheme are described above with respect to FIG. 5.

As mentioned earlier, the random access detection unit 102 can function as a specialized searcher. Both the one or more searchers 104 and random access detection unit 102 provide path delay information for use in the RAKE receiver 108. Consequently, in accordance with the present invention, if all of the uplink data channels use a virtually identical scheme for the data portion of the random access request, every RAKE receiver component (or RAKE finger) 108a–108n can be assigned by the control unit 106 to demodulate the information received on one propagation path. Consequently, a set of RAKE components can be shared both for the dedicated physical channels (conventional uplink data), and for data packet transmissions on the common physical channel in the random access mode of operation. Therefore, in accordance with the random access scheme implemented by the present invention, the number of RAKE components required can be minimized.

Figure 7:
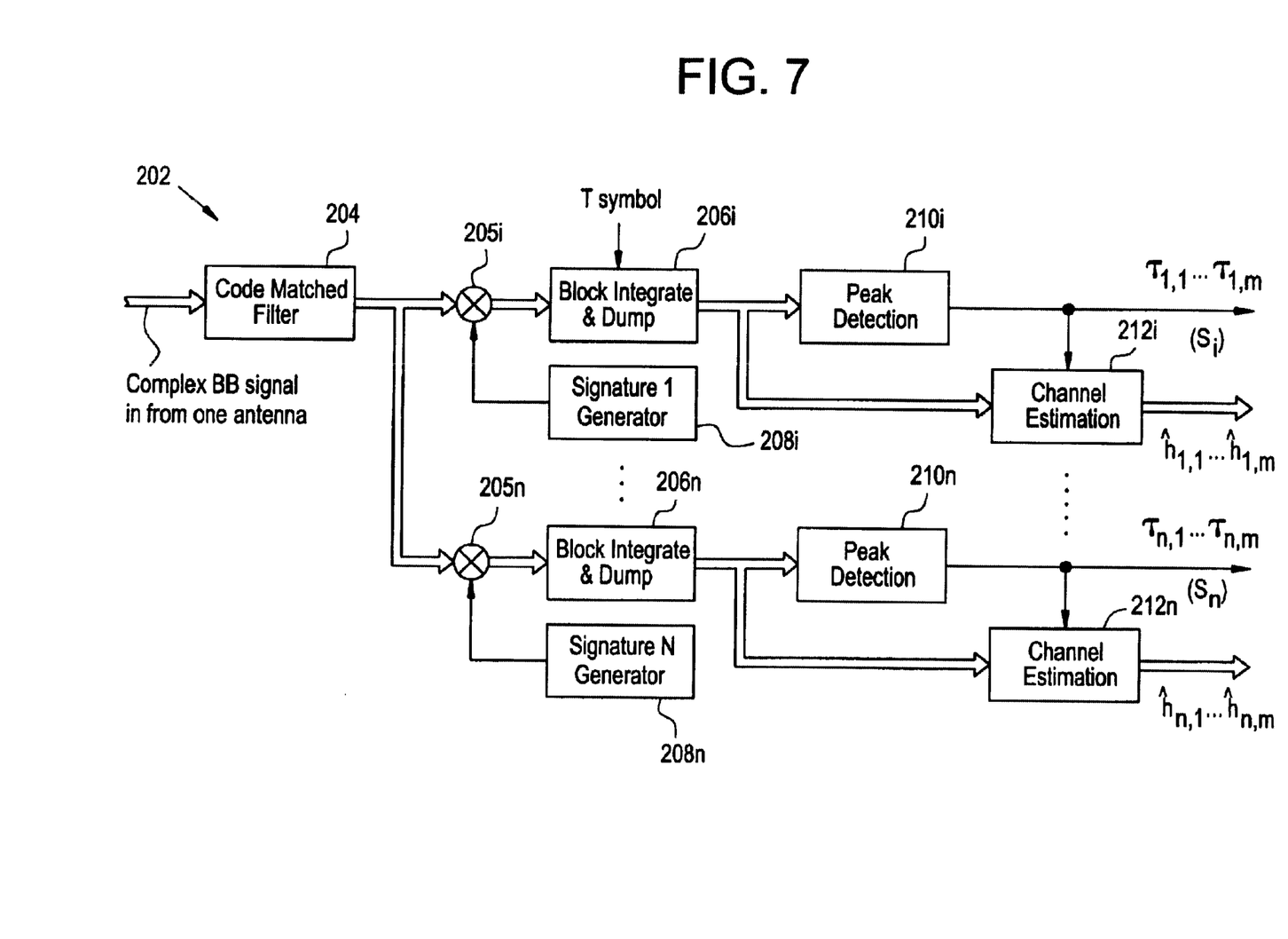
FIG. 7 is a block diagram that shows pertinent details of an exemplary random access detector unit that can be used to implement the functions of the random access detector unit shown in FIG. 6.

FIG. 7 is a block diagram that shows pertinent details of an exemplary random access detector unit (202) that can be used to implement the functions of the random access detector unit 102 shown in FIG. 6. Advantageously, a baseband (BB) signal processing scheme is used, which includes a complex down-conversion in the radio frequency-(RF) front end. The complex down-conversion is performed by mixing the received signal with a sine- and cosine-carrier (both carriers at the same frequency). The exemplary random access detector unit 202 can be used for the I branch (for one antenna) of a base station's random access receiver. A similar random access detector unit can be used for the Q branch. As such, the flow of complex signals is denoted by the double-lined arrows shown.

The random access detector unit 202 includes a matched filter 204. The matched filter, which is used only during the preamble period, is tuned to the preamble's spreading code (that had been provided to the MS by the base station). The matched filter 204 is used to detect the presence of the random access request, despread the preamble part of the random access packet, and couple the resulting signal to an accumulator. The accumulator is comprised of a plurality of accumulator sections, each of which includes a block integrate and dump module 206i–n (where i=1 to n), and an associated signature generator section 208i–n. Each received preamble includes a unique signature pattern, and each accumulator section (i–n) is tuned to one of the possible signature patterns to be received. Consequently, the different received random access requests can be separated by remodulating (205i–n) the output of the code-matched filter 204 with the desired signature symbols (from the signature generator sections 208i–n), and coherently accumulating the remodulated signals in the block integrate and dump modules 206i–n.

The output of each accumulator section (block integrate and dump module 206i–n) is coupled to a respective peak detection unit 210i–n. At the end of the preamble period, each peak detection unit 210i–n searches the output signal from its respective accumulator (module 206i–n) for each signal peak that exceeds a predetermined detection threshold. Each peak detection unit 210i–n then measures the position in time, $\tau_i$–$\tau_M$ (i.e., over the preamble's "M" symbol periods), of the respective peak signal. If the absolute value of that peak exceeds a predetermined threshold, the related time position (time delay) value, $\tau_i$–$\tau_M$, is output to the control unit 106 and to the channel estimation unit 212i. The channel estimator may be used to provide initial values for a lowpass filter in the-channel estimator of a RAKE finger 108a–n, which is assigned to demodulate the subsequent data part of the random access request. These initial values, $\hat{h}_i$–$\hat{h}_n$, are taken from the block integrate and dump modules 206 at the measured time positions, $\tau_i$–$\tau_M$. As such, the accumulation result (complex peak value) at each time delay position is output to the controller unit 106, to be used for selecting a RAKE finger 108a–n. The output of each channel estimation unit (accumulator branch) 212i–n corresponds to a respective signature pattern, $S_i$–$S_n$.

Figure 8:
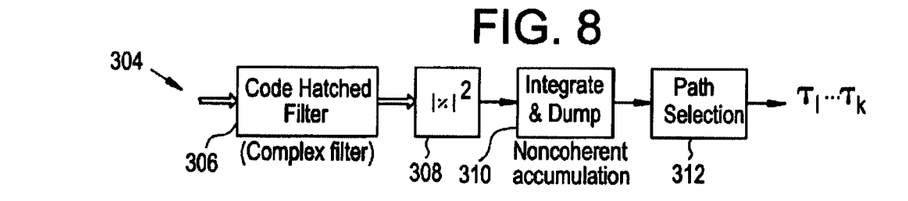
FIG. 8 is a block diagram that shows pertinent details of an exemplary searcher unit that can be used to implement the functions of the searcher unit(s) shown in FIG. 6.

FIG. 8 is a block-diagram that shows pertinent details of an exemplary searcher unit (304) that can be used to implement the functions of the searcher unit(s) 104 shown in FIG. 6. The exemplary searcher unit 304 includes a code matched filter 306, which is matched to the pilot sequence of the dedicated data channel being used. The absolute value squared (308) of the complex signal output from the matched filter 306 is (symbol-by-symbol) non-coherently accumulated in the integrate and dump unit 310 because of the frequency offsets of the input complex signal. The path selection unit 312 searches for the highest peaks in the output from the integrate and dump unit 310 (delay power spectrum or DPS), by comparing each peak with a predetermined threshold value. The path delays, $\tau_i$–$\tau_k$, associated with the highest peak signal values are output to the control unit 106, to be used for selecting a RAKE finger 108a–n.

Figure 9:
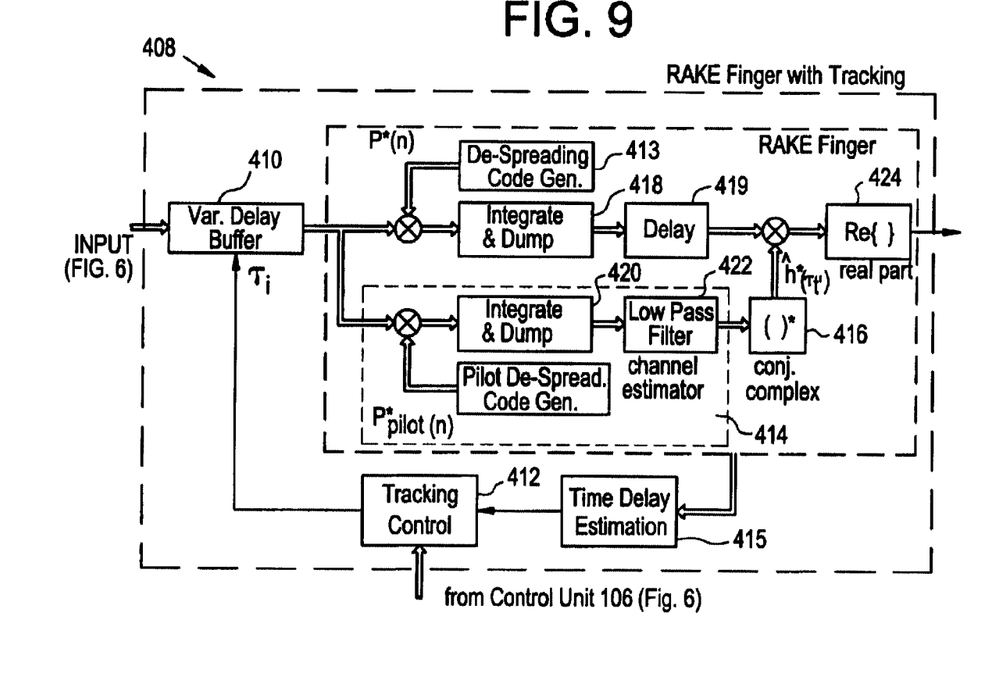
FIG. 9 is a block diagram that shows pertinent details of an exemplary RAKE finger that can be used to implement the functions of a RAKE finger shown in FIG. 6.

FIG. 9 is a block diagram that shows pertinent details of an exemplary RAKE finger (408a–n) that can be used to implement the functions of a RAKE finger 108a–n shown in FIG. 6. The RAKE receiver unit 108 comprises a plurality of RAKE fingers 108a–n (e.g., 408a–n). Each finger 408a–n is assigned to a respective path delay ($T_i$). Each traffic channel/user requires one RAKE receiver unit 108 (408). The different delay times, $\tau_i$, are compensated for by the use of a controlled variable delay buffer 410. The initial setting for $\tau_i$ is provided from the random access detector unit 202 in FIG. 7 via the control unit 106 (FIG. 6) and tracking control unit 412. The actual values for $\tau_i$ can be provided from the searcher unit 304 in FIG. 8 via the control unit 106 (FIG. 6) and tracking control unit 412, or estimated with the time delay estimation unit 415. For the latter option, the time delay estimation unit 415 can be implemented with a known early-late delay discriminator (delay-locked loop technique)

using inputs from the code generator 413 and delay buffer 410, to calculate a non-coherent time delay. The received (input) signal is despread (413) by the conjugate complex (416) of the original spreading code used, and coherently accumulated (418) symbol-by-symbol. Each received symbol is weighted by a conjugate complex channel estimate, $\hat{h}^*(\tau i)$.

The channel estimate is calculated in a similar manner by the channel estimator unit 414, but based on the input pilot channel. The coherently accumulated despread pilot codes from the channel estimation integrate and dump unit 420 are passed through a low-pass filter 422. The real parts (424) of the RAKE finger unit outputs (108*a–n*) are combined to form a soft decision value, which is the output of the RAKE receiver 108. As such, the number of RAKE fingers thus assigned (per the control unit 106) depends on the number of valid path delays, which are selected by the searcher unit(s) 104.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A frame structure for transmission on a random access channel from a mobile terminal to a mobile communications system, said frame structure comprising:
   a preamble including at least one signature,
   a data portion comprising a control part and a data part, said at least one signature indicating a plurality of codes for spreading said control part and said data part, and,
   a guard time interval after said preamble and before said data portion,
   whereby a random access request using said frame structure is transmitted from said mobile terminal to said mobile communication system.

2. The frame structure of claim 1, wherein said plurality of codes includes a first code for spreading said control part, and at least a second code for spreading said data part.

3. The frame structure of claim 2, wherein said first code and said at least a second code are orthogonal to each other.

4. The frame structure of claim 1, wherein said plurality of codes includes a second plurality of codes for spreading said data part, each of said second plurality of codes associated with a plurality of spreading factors.

5. The frame structure of claim 1, wherein said plurality of codes includes a second plurality of codes for spreading said data part, each of said second plurality of codes associated with a respective spreading factor.

6. The frame structure of claim 2, wherein said first code and said at least a second code are each associated with a sub-tree of a code-tree.

7. The frame structure of claim 5, wherein each of said second plurality of codes is associated with a same branch of a sub-tree of a code-tree.

8. A frame structure for transmission on a random access channel from a mobile terminal to a mobile communications system, said frame structure comprising:
   a preamble;
   a data portion; and
   a guard portion between said preamble and said data portion,
   whereby a random access request using said frame structure is transmitted from said mobile terminal to said mobile communication system.

9. The frame structure of claim 8, wherein said preamble is modulated by a preselected signature pattern.

10. The frame structure of claim 8, wherein said preamble is modulated by a signature pattern randomly selected from a plurality of orthogonal codes.

11. The frame structure of claim 8, wherein the mobile communications system comprises a CDMA system.

12. The frame structure of claim 8, wherein said data portion includes user data and at least one pilot symbol.

13. The frame structure of claim 8, wherein said data portion includes user data and no pilot symbol.

14. The frame structure of claim 13, wherein said user data is transmitted on an I branch or Q branch.

15. The frame structure of claim 8, wherein signature detection and RAKE receiver assignment occurs during a time interval associated with said guard portion.

16. The frame structure of claim 12, wherein said at least one pilot symbol is transmitted on an I branch or Q branch.

17. The frame structure of claim 8, wherein said data portion includes a rate indicator.

18. The frame structure of claim 17, wherein said rate indicator is associated with a predetermined transmission is data rate and at least one of a preselected plurality of signature patterns.

19. The frame structure of claim 17, wherein said rate indicator is included in a control portion of the random access channel.

20. The frame structure of claim 19, wherein said rate indicator is included in a beginning of said control portion.

21. The frame structure of claim 19, wherein said rate indicator is spread over said control portion.

22. The frame structure of claim 17, wherein said rate indicator is associated with a variable length data portion.

23. The frame structure of claim 17, wherein said rate indicator is associated with a predetermined length data portion.

24. The frame structure of claim 8, wherein a transmission rate for the random access channel is associated with a predetermined spreading factor.

25. The frame structure of claim 8, wherein said data portion is spread with a predetermined code associated with a predetermined mobile station.

26. The frame structure of claim 8, wherein said data portion is spread with a predetermined code associated with a plurality of mobile stations.

27. The frame structure of claim 26, wherein a control portion of said random access channel is spread with a first spreading code and said data portion is spread with a second spreading code, said first spreading code orthogonal to said second spreading code.

28. The frame structure of claim 27, wherein said first and second spreading codes are each associated with a sub-tree of a code-tree.

29. The frame structure of claim 8, wherein a data portion of the random access channel is virtually identical in structure to a dedicated physical channel in the mobile communications system.

30. The frame structure of claim 8, wherein said guard portion is equal to zero.

31. A random access frame structure transmitted on a random access channel from a mobile terminal to a mobile communications system, said random access frame structure comprising:
   a preamble;

a data portion; and a guard portion between said preamble and said data portion, said guard portion enables interruption of the transmissions between the mobile terminal and the mobile communications system.

32. The random access frame structure of claim 31, wherein said guard portion further enables timing of the random access frame structure to be aligned with a frame slot scheme of the mobile communications system.

33. The random access frame structure of claim 31, wherein said preamble is I/Q multiplexed.

34. The random access frame structure of claim 31, wherein said data portion includes user data and at least one pilot symbol.

35. The random access frame structure of claim 31, wherein said data portion includes a rate indicator associated with a predetermined transmission rate and at least one of a preselected plurality of signature patterns.

36. The random access frame structure of claim 31, wherein a control portion of the random access channel is spread with a first spreading code and said data portion is spread with a second spreading code, said first spreading code orthogonal to said second spreading code.

37. A random access frame structure transmitted on a random access channel from a mobile terminal to a mobile communications system, said random access frame structure comprising:

an I/Q multiplexed preamble modulated by a preselected signature pattern;

a data portion; and;

a guard portion between said I/Q multiplexed preamble and said data portion, said guard portion enables detection of said I/Q multiplexed preamble by the mobile communications system before arrival of said data portion thus requiring less buffering and minimizing random access delay.

38. The random access frame structure of claim 37, wherein said data portion is virtually identical in structure to a portion of a dedicated physical uplink channel in the mobile communications-system, wherein a frame structure for both the random access channel and the dedicated physical -uplink channel are compatible.

39. A mobile communications system comprising:

a mobile terminal for transmitting a random access frame structure on a random access channel; and a base station for receiving the random access frame structure, said random access frame structure further including:
a preamble
a data portion; and
a guard portion between said preamble and said data portion, said guard portion enables interruption of the transmissions between said mobile terminal and said base station.

40. The mobile communications system of claim 39, wherein said guard portion further enables timing of the random access frame structure to be aligned with a frame slot scheme of the mobile communications system.

41. The mobile communications system of claim 39, wherein said guard portion enables detection of said preamble by said base station before arrival of said data portion thus requiring less buffering and minimizing random access delay.

42. The mobile communications system of claim 39, wherein said preamble is I/Q multiplexed.

43. The mobile communications system of claim 42, wherein said I/Q multiplexed preamble enables frame structure compatibility of a random access scheme and an uplink channel scheme within the mobile communications system.

44. The mobile communications system of claim 39, wherein said data portion includes a rate indicator associated with a predetermined transmission rate and at least one of a preselected plurality of signature patterns.

45. The mobile communications system of claim 39, wherein a control portion of the random access channel is spread with a first spreading code and said data portion is spread with a second spreading code, said first spreading code orthogonal to said second spreading code.

46. A random access frame structure transmitted on a random access channel from a mobile terminal to a mobile communications system, said random access frame structure comprising:

a preamble;

a data portion; and a guard portion between said preamble and said data portion, wherein no transmissions occur between the mobile terminal and the mobile communications system during an interval corresponding with said guard portion.

47. The random access frame structure of claim 46, wherein said guard portion further enables timing of the random access frame structure to be aligned with a frame slot scheme of the mobile communications system.

48. The random access frame structure of claim 46, wherein said preamble is I/Q multiplexed.

49. The random access frame structure of claim 46, wherein said data portion includes user data and at least, one pilot symbol.

50. The random access frame structure of claim 46, wherein said data portion includes a rate indicator associated with a predetermined transmission rate and at least one of a preselected plurality of signature patterns.

51. The random access frame structure of claim 46, wherein a control portion of the random access channel is spread with a first spreading code and said data portion is spread with a second spreading code, said first spreading code orthogonal to said second spreading code.

* * * * *